US012632179B2

(12) United States Patent
Lien et al.

(10) Patent No.: US 12,632,179 B2
(45) Date of Patent: May 19, 2026

(54) SYSTEM USAGE OF A FAST READ MODE FOR READ PERFORMANCE

(71) Applicant: Micron Technology, Inc., Boise, ID (US)

(72) Inventors: Yu-Chung Lien, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/781,733

(22) Filed: Jul. 23, 2024

(65) Prior Publication Data

US 2026/0029919 A1     Jan. 29, 2026

(51) Int. Cl.
    *G06F 3/06* (2006.01)

(52) U.S. Cl.
    CPC .......... *G06F 3/0611* (2013.01); *G06F 3/0659* (2013.01); *G06F 3/0679* (2013.01); *G06F 2212/7206* (2013.01)

(58) Field of Classification Search
    CPC .... G06F 3/0611; G06F 3/0659; G06F 3/0679; G06F 2212/7206
    See application file for complete search history.

(56) References Cited

U.S. PATENT DOCUMENTS

| | | | |
|---|---|---|---|
| 10,566,063 B2 * | 2/2020 | Sheperek | .............. G06F 3/0659 |
| 2007/0047315 A1 * | 3/2007 | Aritome | .............. G11C 16/102 |
| | | | 365/185.18 |
| 2022/0413714 A1 * | 12/2022 | Hu | .......................... G06F 3/061 |
| 2023/0195381 A1 * | 6/2023 | Liu | .......................... G11C 7/04 |
| | | | 711/103 |

* cited by examiner

*Primary Examiner* — Kalpit Parikh
(74) *Attorney, Agent, or Firm* — Lowenstein Sandler LLP

(57) ABSTRACT

A system comprises a memory device and a processing device, which is coupled to the memory device. The processing device receives a read command to be performed on a set of memory cells of the memory device. The processing device determines whether a reliability metric satisfies a threshold criterion associated with the memory device. Responsive to determining that the reliability metric satisfies the threshold criterion associated with the memory device, the processing device selects a first set of trim values, wherein the first set of trim values corresponds to a latency value that is below a predefined threshold value. The processing device executes the read command with the selected set of trim values.

20 Claims, 3 Drawing Sheets

SYSTEM USAGE OF A FAST READ MODE FOR READ PERFORMANCE

TECHNICAL FIELD

Embodiments of the disclosure relate generally to memory sub-systems, and more specifically, relate to system usage of a fast read mode for read performance in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
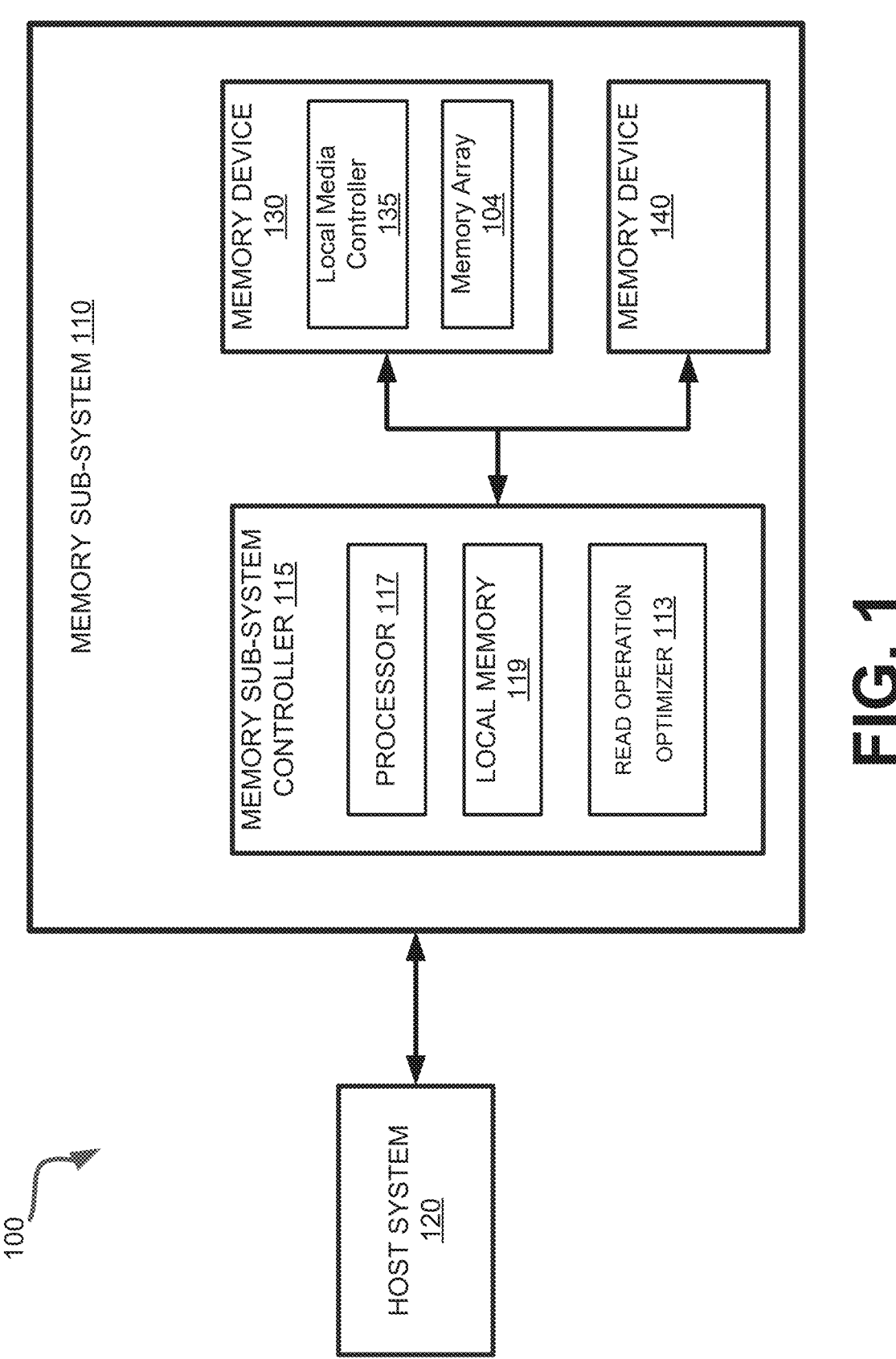
FIG. 1 illustrates an example computing system that includes a memory sub-system in accordance with some embodiments of the present disclosure.

Aspects of the present disclosure are directed to trim values for read operations. Specifically, the system usage of a fast read mode for read performance. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not- and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells can be formed onto a silicon wafer in an array of columns and rows. A bitline can refer to one or more conductive lines coupled to a column of associated memory cells in a memory device. A wordline can refer to one or more conductive lines coupled to a row of associated memory cells in a memory device that are used with one or more bitlines to generate the address of each of the memory cells. The intersection of a bitline and a wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Various access operations can be performed on memory cells, including writing to, reading from, and erasing data. These cells are typically organized into pages, which are the smallest write units in some types of memory devices. Further, pages are grouped into sub-blocks along the same wordline, with only one sub-block accessed at any given time. Although each sub-block has its own set of select gates connected to bit lines, they all share a common page buffer or sense amplifier.

During a read operation, the processing logic within the memory subsystem is tasked with determining the data stored in a memory cell. This is achieved by identifying which predetermined threshold voltage distribution the cell's measured threshold voltage falls within. Threshold voltages are used to represent different data states but due to various factors, including manufacturing variances, wear, and temperature fluctuations, the charge stored in a cell—thus its voltage level—can vary. This variance results in a distribution of threshold voltages (e.g., a "threshold voltage distribution") for each voltage level. The spaces between these threshold voltage distributions (hereafter referred to as "valleys") are used to differentiate between the threshold voltage distributions representing each possible data value.

The read operation is executed by applying a read voltage and then comparing the cell's measured threshold voltage against this applied voltage to determine its threshold voltage distribution. The sense amplifier detects these small changes in voltage against a reference voltage and amplifies them to a full digital logic level, thus ensuring the accurate and reliable retrieval of data. In some embodiments, a single memory cell can be configured to store multiple bits of information: a memory cell operated with $2^n$ different threshold voltage levels is capable of storing n bits of information. Thus, a read operation can be performed by comparing the measured voltage exhibited by the memory cell to one or more reference voltage levels in order to distinguish between two logical levels for single-level cells and between multiple logical levels for multi-level cells.

A memory device can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store two, three, and four bits per cell, respectively. Each cell stores data by maintaining a specific charge level within the cell, which corresponds to a voltage level. These voltage levels represent the binary data stored in the cells, with SLC having two levels (for 0 and 1), MLC four levels (for 00, 01, 10, 11), TLC eight levels (for 000 to 111), and QLC sixteen levels (for 0000 to 1111). As the number of voltage levels in a memory cell increases, the valley margins between these levels decrease, which can reduce reliability due to a higher susceptibility to read errors and data corruption.

Characteristics of how voltage is applied or time is used during the read operation (e.g., trim settings) may affect performance of a memory device. For example, a decreased pre-charge time (e.g., the duration for which the bit lines are charged to a reference voltage before reading begins) may result in improved read latency (e.g., quicker read operations). However, if the pre-charge time is too short, the bit lines may not reach the stable reference voltage required for accurate reading. This reduced pre-charge time can compromise reliability and increase the likelihood of read errors or unreliable data as the sense amplifiers may not correctly interpret the state of the memory cells, particularly if the memory's condition is suboptimal. Due to these risks, conventional systems often employ conservative (e.g., high latency) trim settings designed for worst-case scenarios to ensure reliability. While this conservative trim minimizes errors, it also introduces unnecessary latency that could be reduced in systems capable of handling lower latency trim settings.

Aspects of the present disclosure address the above and other deficiencies by providing an additional set of trim values that correspond to lower latency than a universally applicable set of trim values. "Trim values" may refer to values related to read operation characteristics such as pass voltage delay (timing), boost time (timing), sensing time (timing), and the like. One or more sets of trim values may be stored by the memory device. A set of trim values may be better suited for certain situations than others. The one or more sets of trim values may be stored by read-only memory (ROM) of the memory device. In some embodiments, the ROM may be fuses or any other device capable of storing firmware or otherwise embedded software. A controller of the memory device (i.e., a memory sub-system controller, a memory device controller, etc.) can determine which set of trim values is to be used by the memory device prior to execution of a read operation. In some embodiments, trim settings can be selected through the execution of a prefix command.

The processing logic may determine the set of trim values for a read operation based on whether a threshold criterion associated with a reliability metric (e.g., a data state metric) of the memory device is satisfied. For example, bit-error-rate (BER) can be used to determine whether a system can handle a lower latency set of trim settings for read operations. If the BER exceeds a threshold maximum (failing to satisfy a threshold criterion), the processing logic may select more conservative trim settings for executing a read command.

Advantages of the present disclosure include increased performance and a decrease in unnecessary latency. For example, when performing read operations on memory configured to store data in SLC format, since SLC memory only stores one bit per cell, resulting in just two voltage levels (one for '0' and one for '1'), the valleys between these levels are wider. This greater separation makes it easier for the system to distinguish between the voltage levels, enhancing reliability and allowing for faster read operations without significantly increasing the risk of errors. A lower latency set of trim settings can take advantage of the larger valleys and the controller can always revert to a more conservative set of trim settings based on a reliability metric of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a read operation optimizer component 113 that can determine the optimum set of trim values for a read operation based on whether a threshold criterion associated with a reliability metric of the memory device is satisfied. In some embodiments, the memory sub-system controller 115 includes at least a portion of the read operation optimizer component 113. In some embodiments, the read operation optimizer component 113 is part of the host system 120, an application, or an operating system. In other embodiments, local media controller 135 includes at least a portion of read operation optimizer component 113 and is configured to perform the functionality described herein.

The read operation optimizer component 113 can determine the optimum set of trim values for a read operation based on whether a threshold criterion associated with a reliability metric of the memory device is satisfied. In some embodiments, the threshold criterion to be satisfied is a BER. A BER below a maximum acceptable threshold (e.g., satisfying the threshold criterion) indicates that the memory device is capable of handling a set of trim values corresponding to a lower read latency than those that would be used with a high BER. Based on the reliability metric, the read operation optimizer component 113 executes the read command using the set of trim values corresponding to a lower read latency. If the BER exceeds a maximum acceptable threshold for BER (failing to satisfy the threshold criterion), the component 113 selects a set of trim values corresponding to a more conservative (higher) read latency. Further details with regards to the operations of the read operation optimizer component 113 are described below.

Figure 2:
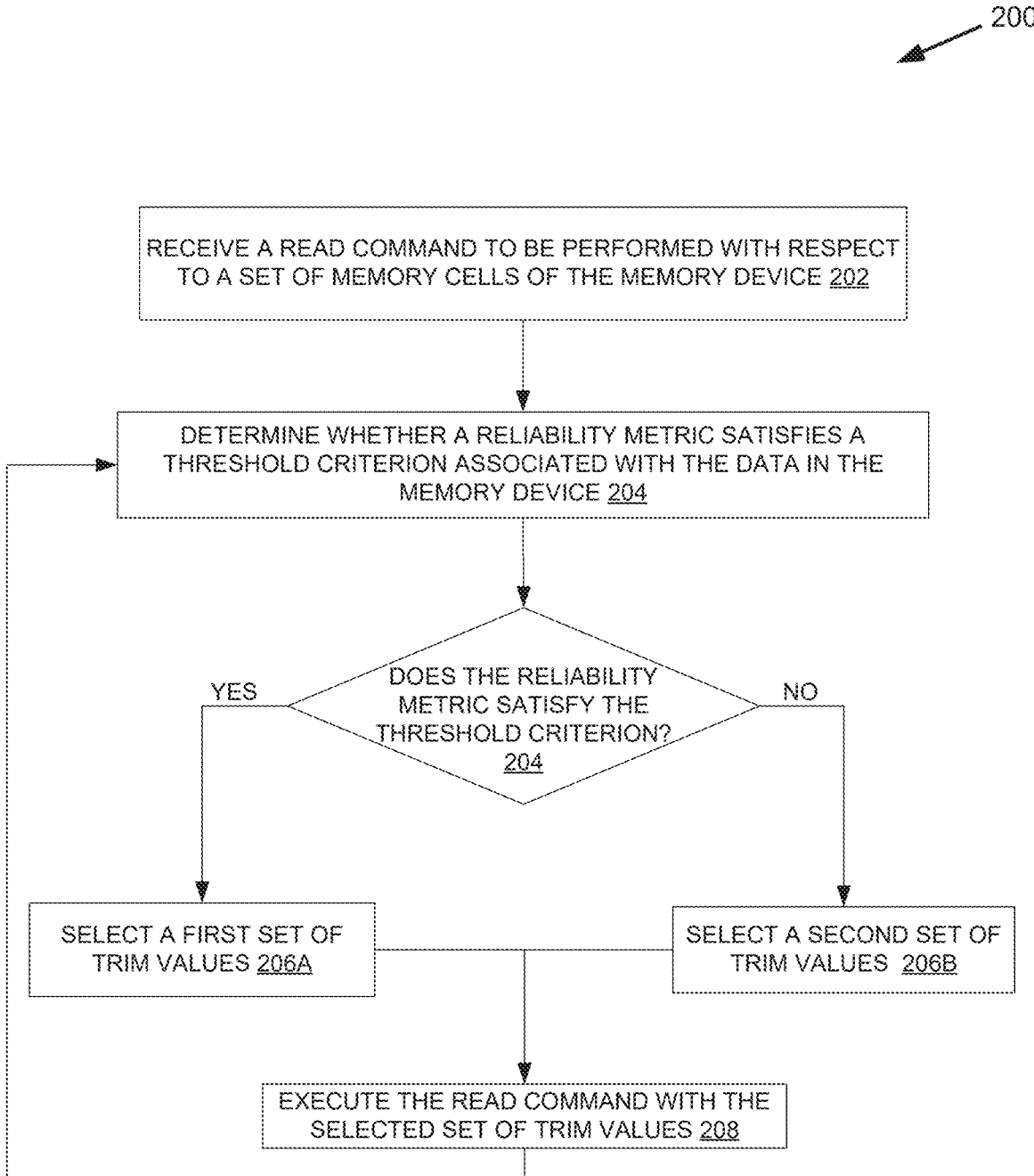
FIG. 2 is a flow diagram illustrating a decision process of an example method when selecting between sets of trim values, in accordance with some embodiments of the present disclosure.

FIG. 2 is a flow diagram of an example method 200 for a low latency read mode, in accordance with some embodiments of the present disclosure. The method 200 can be performed by processing logic (e.g., Read Operation Optimizer component 113) that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the read operation optimizer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic (e.g., Read Operation Optimizer component 113) receives a read command to be performed on a set of memory cells of the memory device. In some embodiments, the processing logic receives the read command generated by a host system, such as the host system 120 of FIG. 1. In some embodiments, the processing logic receives the read command from the memory sub-system controller 115 (e.g., to determine when media management operations should take place). In some embodiments, read commands received from internal algorithms may be generated by the processing logic.

At operation 204, the processing logic determines whether a reliability metric (e.g., a data state metric) satisfies a threshold criterion associated with the memory device.

In some embodiments, the Bit Error Rate (BER) is used as a reliability metric to measure against a threshold criterion associated with the memory device. The threshold criterion specifies a threshold bit error rate. BER is a metric for assessing the integrity and reliability of stored data. Memory such as NAND flash memory is susceptible to various error mechanisms, including program/erase cycle-induced wear, read disturb errors, and data retention failures. These errors manifest as bit flips during read operations. BER is defined as the ratio of the number of bit errors to the total number of bits transmitted or processed. Therefore, an increase in the number of bit errors will proportionally increase the BER.

In an embodiment, the processing logic obtains a BER measurement of the memory device prior to determining that the bit error rate measurement satisfies a bit error rate threshold criterion. In some embodiments, the processing logic obtains a BER measurement of the memory device at timed intervals. In some embodiments, the processing logic obtains a BER measurement of the memory device before executing a read command. In some embodiments, the processing logic obtains a BER measurement of the memory device in response to a host or system command.

In an embodiment using BER as a reliability metric, satisfying the threshold criterion entails the data having a BER at or below a maximum BER value. In some embodiments, this BER value is predetermined as a metric for the minimum reliability acceptable to use trim values (e.g., the first set of trim values) corresponding to a latency value that is below a predefined threshold value. Failing to satisfy the threshold criterion entails the data having a BER exceeding the maximum BER value. Here, trim values that correspond to a higher read latency but increased reliability may be appropriate (e.g., the second set of trim values).

At operation 206A, responsive to determining that the reliability metric satisfies the threshold criterion associated with the memory device, the processing logic selects a first set of trim values, wherein the first set of trim values corresponds to a latency value that is below a predefined threshold value. As discussed above, in an embodiment using BER as a reliability metric, satisfying the threshold criterion entails the data having a BER at or below a maximum acceptable BER value. Data having a BER below a minimum reliability metric such as a maximum acceptable BER value is deemed to accommodate low latency trim values (e.g., the first set of trim values) for performing read operations and allowing for faster read operations while maintaining target reliability specifications.

In some embodiments, responsive to determining that the reliability metric fails to satisfy a threshold criterion, at operation 206B, the processing logic selects a second set of trim values, wherein the second set of trim values corresponds to a higher read latency than the first set of trim values. As discussed above, in an embodiment using BER as a reliability metric, failing to satisfy the threshold criterion entails the data having a BER exceeding a maximum acceptable BER value, indicating that the data cannot accommodate more aggressive, low latency trim settings (e.g., the first set of trim values). The target for the second set of trim values is maintaining target reliability specifications when a faster read operation is not available.

Trim values refer to specific settings or parameters that optimize the performance of memory devices during read operations. In embodiments, these values adjust various aspects of the read process, such as timing margins, voltage levels, and signal integrity, to ensure accurate and efficient data access. A first set of trim values corresponding to a latency value that is below a predefined threshold value comprises settings that can differ from a second set of trim values, which correspond to higher read latency than the first set of trim values. This differentiation allows for tailored optimization based on desired performance and reliability characteristics.

For example, in some embodiments, the first set of trim values comprises a first sensing time which is less than a second sensing time of the second set of trim values. Sensing time refers to the duration of time sense amplifiers detect and stabilize the electrical signals from the flash memory cells. During this time, the sense amplifiers read the small voltage differences representing stored data from the memory cells and amplify these signals to discern the binary information accurately. Decreasing the sensing time, when appropriate (e.g., when the reliability metric satisfies the associated threshold criteria), allows for a decrease in read latency and increased read performance.

In some embodiments, the first set of trim values comprises a first pre-charge time which is less than a second pre-charge time of the second set of trim values. Pre-charge timing sets the duration for which the bit lines are pre-charged to a known voltage before reading begins. Decreasing the pre-charge time, when the reliability metric allows it (e.g., satisfying the associated threshold criteria), allows for a decrease in read latency and increased read performance.

In some embodiments, the first set of trim values comprises a first boost time which is less than a second boost time of the second set of trim values. Boost time refers to a specific duration during which certain operational parameters, such as voltage levels or signal strengths, are temporarily enhanced. This enhancement is designed to address various issues that can affect the performance and reliability of memory cells. For instance, cell-to-cell interference, where the operation of one cell can inadvertently influence neighboring cells, can be mitigated by temporarily increasing the voltage levels. Additionally, as memory cells age, their ability to retain charge diminishes, leading to potential data integrity issues. Boosting the signal strength can help to ensure that the data can still be read accurately despite these aging effects. Decreasing the boost time of a read operation, when the reliability metric allows it (e.g., satisfying the associated threshold criteria), allows for a decrease in read latency and increased read performance.

In some embodiments, the first set of trim values comprises a first pass voltage delay time which is less than a second pass voltage delay time of the second set of trim values. Pass voltage delay time refers to the specific timing delay before the application of the initial voltage level that exceeds the threshold required for either detection (reading) or programming (writing) in NAND flash memory cells. Applying a pass voltage aids in selecting the appropriate cell by surpassing the threshold voltage, enabling the read or write operation to be performed accurately. The delay before applying the pass voltage ensures that the voltage levels stabilize, reducing errors and minimizing interference.

Decreasing the pass voltage delay time, when the reliability metric allows it (e.g., satisfying the associated threshold criteria), allows for a decrease in read latency and increased read performance.

At operation 208, the processing logic executes the read command with the selected set of trim values. In some embodiments, the selected set of trim values are applied through the execution of a prefix command, prior to the execution of the read command. As part of the prefix command, the read command includes a parameter specifying the use of the first set of trim values. In some embodiments, the processing logic executes subsequent read commands with the selected set of trim values, depending on the satisfaction of the threshold criterion by a reliability metric. In some embodiments, the processing logic stores the selected set of trim values in a metadata portion of the firmware as long as the threshold condition is satisfied.

In some embodiments, the memory device is configured to store a single bit per memory cell. When performing read operations on memory configured to store data in SLC format, since SLC memory only stores one bit per cell, resulting in just two voltage levels, the valleys between these voltage levels are wider. This greater separation makes it easier for the system to distinguish between the voltage levels, enhancing reliability and allowing for faster read operations without significantly increasing the risk of errors. Executing the read command using the first set of trim values can take advantage of the larger valleys to maintain reliability with low latency trim settings.

In some embodiments, the executed read command is part of an independent wordline read, where a read operation is performed across multiple planes in different wordlines.

Figure 3:
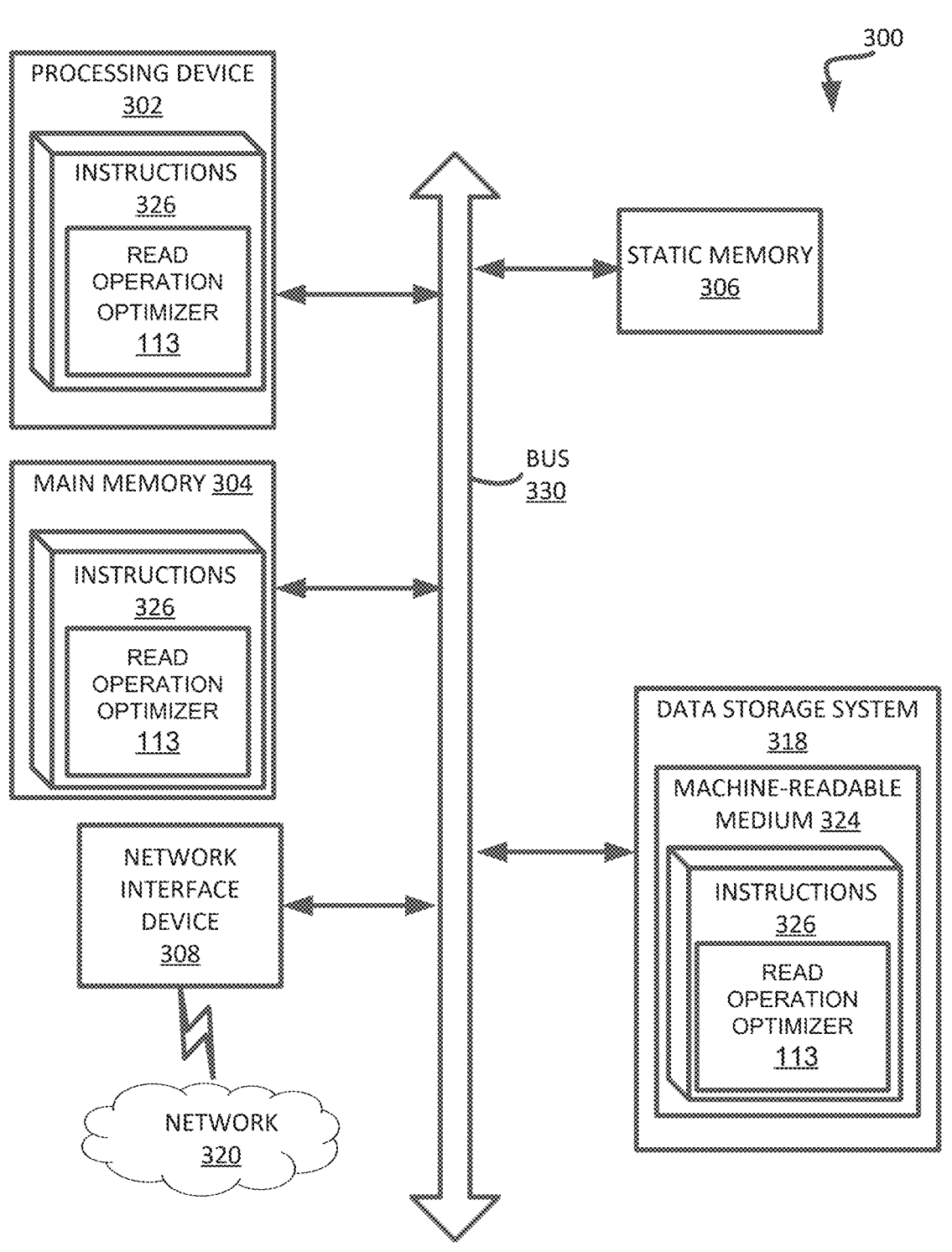
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read operation optimizer component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or RDRAM, etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory sub-system 110 of FIG. 1.

In one embodiment, the instructions 326 include instructions to implement functionality corresponding to a read operation optimizer component (e.g., the read operation optimizer component 113 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, coupled to the memory device, wherein the processing device is configured to perform operations comprising:

receiving a read command with respect to a set of memory cells of the memory device;

responsive to receiving the read command, determining whether a reliability metric with respect to the set of memory cells satisfies a threshold criterion associated with the memory device;

responsive to determining that the reliability metric satisfies the threshold criterion associated with the memory device, selecting a first set of trim values, wherein the first set of trim values corresponds to a latency value that is below a predefined threshold value, and wherein the selected set of trim values is stored in a metadata data structure as long as the threshold criterion is satisfied; and executing the read command with the selected set of trim values.

2. The system of claim 1, further comprising:

responsive to determining that the reliability metric fails to satisfy the threshold criterion, selecting a second set of trim values, wherein the second set of trim values corresponds to a higher read latency than the first set of trim values.

3. The system of claim 1, wherein the threshold criterion specifies a threshold bit error rate.

4. The system of claim 2, wherein the first set of trim values comprises a first sensing time which is less than a second sensing time of the second set of trim values.

5. The system of claim 2, wherein the first set of trim values comprises a first pre-charge time which is less than a second pre-charge time of the second set of trim values.

6. The system of claim 2, wherein the first set of trim values comprises a first boost time which is less than a second boost time of the second set of trim values.

7. The system of claim 2, wherein the first set of trim values comprises a first pass voltage delay time which is less than a second pass voltage delay time of the second set of trim values.

8. The system of claim 2, wherein the read command includes a parameter specifying use of the first set of trim values.

9. A method comprising:

receiving, by a processing device, a read command to be performed on a set of memory cells of a memory device;

responsive to receiving the read command, determining whether a reliability metric with respect to the set of memory cells satisfies a threshold criterion associated with the memory device;

responsive to determining that the reliability metric satisfies the threshold criterion associated with the memory device, selecting a first set of trim values, wherein the first set of trim values corresponds to a latency value that is below a predefined threshold value, and wherein the selected set of trim values is stored in a metadata data structure as long as the threshold criterion is satisfied; and executing the read command with the selected set of trim values.

10. The method of claim 9, further comprising:

responsive to determining that the reliability metric fails to satisfy the threshold criterion, selecting a second set of trim values, wherein the second set of trim values corresponds to a higher read latency than the first set of trim values.

11. The method of claim 9, wherein determining whether the reliability metric satisfies the threshold criterion associated with the memory device comprises:

obtaining a bit error rate measurement of the memory device; and determining that the bit error rate measurement satisfies a bit error rate threshold criterion.

12. The method of claim 10, wherein the first set of trim values comprises a first sensing time which is less than a second sensing time of the second set of trim values.

13. The method of claim 10, wherein the first set of trim values comprises a first pre-charge time which is less than a second pre-charge time of the second set of trim values.

14. The method of claim 10, wherein the first set of trim values comprises a first boost time which is less than a second boost time of the second set of trim values.

15. The method of claim 10, wherein the first set of trim values comprises a first pass voltage delay time which is less than a second pass voltage delay time of the second set of trim values.

16. The method of claim 10, wherein the read command includes a parameter specifying use of the first set of trim values.

17. A non-transitory computer-readable storage medium comprising instructions that, when executed by a processing device, cause the processing device to perform operations comprising:

receiving a read command to be performed on a set of memory cells of a memory device;

responsive to receiving the read command, determining whether a reliability metric with respect to the set of memory cells satisfies a threshold criterion associated with the memory device;

responsive to determining that the reliability metric satisfies the threshold criterion associated with the memory device, selecting a first set of trim values, wherein the first set of trim values corresponds to a latency value that is below a predefined threshold value, and wherein the selected set of trim values is stored in a metadata data structure as long as the threshold criterion is satisfied; and executing the read command with the selected set of trim values.

18. The non-transitory computer-readable storage medium of claim 17, further comprising:

responsive to determining that the reliability metric fails to satisfy the threshold criterion, selecting a second set of trim values, wherein the second set of trim values corresponds to a higher read latency than the first set of trim values.

19. The non-transitory computer-readable storage medium of claim 17, wherein determining whether the reliability metric satisfies the threshold criterion associated with the memory device comprises:

obtaining a bit error rate measurement of the memory device; and determining that the bit error rate measurement satisfies a bit error rate threshold criterion.

20. The non-transitory computer-readable storage medium of claim 17, wherein the read command includes a parameter specifying use of the first set of trim values.

* * * * *